United States Patent [19]

Halliwell

[11] Patent Number: 5,027,555
[45] Date of Patent: Jul. 2, 1991

[54] WINDOW REGULATOR

[75] Inventor: Martin C. Halliwell, Kidlington, United Kingdom

[73] Assignee: Rover Group Limited, England

[21] Appl. No.: 578,783

[22] Filed: Sep. 6, 1990

[30] Foreign Application Priority Data

Sep. 11, 1989 [GB] United Kingdom ............... 8920486

[51] Int. Cl.⁵ ............................................. E05F 11/44
[52] U.S. Cl. ........................................ 49/351; 49/376
[58] Field of Search .................. 49/350, 351, 348, 376

[56] References Cited

U.S. PATENT DOCUMENTS

| | | | |
|---|---|---|---|
| 1,821,957 | 9/1931 | Ball | 49/376 |
| 1,905,429 | 4/1933 | Ball | 49/376 X |
| 3,273,286 | 9/1966 | Brissette et al. | 49/376 X |
| 3,888,047 | 6/1975 | Chikaraishi | 49/351 |
| 4,221,079 | 9/1980 | Becker | 49/351 |
| 4,924,627 | 5/1990 | Lam et al. | 49/351 |

*Primary Examiner*—Philip C. Kannan
*Attorney, Agent, or Firm*—Davis, Bujold & Streck

[57] ABSTRACT

A window regulator for a motor vehicle is provided. The window regulator is arranged to provide a controlled movement of a window pane between a raised position and a lowered position, the window pane being guided on two opposite edges by guide means. The window regulator comprises a lifting arm slidingly connected to the window pane at one end and pivotable about a point near its other end, means to produce rotation of the lifting arm about the point to produce said controlled movement of the window pane and a control arm slidingly connected to the window pane at one end and constrained at its other end to move in a pre-determined manner in response to pivotal movement of the lifting arm about the said point. The lifting arm and the control arm are pivotally interconnected intermediate their respective ends at a position spaced from the said point and means are provided to bias the window pane towards one of the guide means at least when the window pane approaches its raised position.

9 Claims, 3 Drawing Sheets

WINDOW REGULATOR

BACKGROUND TO THE INVENTION

This invention relates to a window regulator and in particular to a cross-arm window regulator for a motor vehicle.

DESCRIPTION OF THE PRIOR ART

It is known to provide a window regulator comprising a lifting arm and a control arm pivotally interconnected intermediate their ends, means to mount the lifting arm for pivotal movement about a point spaced from the position of pivotal interconnection and means to constrain one end of the control arm to move in a pre-determined manner in response to pivotal movement of the lifting arm to provide a controlled movement of a window pane supported upon the other end of the control arm and the end of the lifting arm remote from said point in a direction generally transverse to the direction of movement of said supporting ends towards or away from each other.

Such a window regulator suffers from the disadvantage that the mechanism has to be carefully set and the window pane guided with a high degree of accuracy if good sealing is to be obtained.

SUMMARY OF THE INVENTION

According to the invention there is provided a window regulator for a motor vehicle the window regulator being arranged to provide a controlled movement of a window pane between a raised position and a lowered position, the window pane being guided on two opposite edges by guide means the window regulator comprising a lifting arm slidingly connected to the window pane at one end and pivotable about a point near its other end, means to produce rotation of said lifting arm about said point to produce said controlled movement of the window pane and a control arm slidingly connected to the window pane at one end and constrained at its other end to move in a pre-determined manner in response to pivotal movement of the lifting arm about said point, the lifting arm and the control arm being pivotally interconnected intermediate their respective ends at a position spaced from said point wherein means are provided to bias said window pane towards one of said guide means at least when the window pane approaches its raised position.

Such a window regulator overcomes the disadvantages of the prior art.

Preferably, the means to bias the window pane is a spring.

The spring may be interposed between said one end of the control arm and a position on the window pane.

Advantageously the spring may be a compression spring interposed between said one end of the control arm and an abutment fixed to the window pane.

Preferably, the locus of movement of said one end of the control rod is such that the said one end moves towards said abutment as the window pane is moved from its lowered position to its raised position.

Advantageously, when the window pane is in its lowered position the distance between the abutment and said one end of the control arm may be greater than the free length of the compression spring.

Alternatively, the spring may be a tension spring interposed between said one end of the control arm and an attachment means fixed to the window pane.

Preferably, the locus of movement of said one end of the control arm is such that the said one end moves away from said attachment means as the window pane is moved from its lowered position to its raised position.

Advantageously, when the window pane is in its lowered position the distance between the attachment means and said one end of the control rod may be substantially equal to the free length of the tension spring.

BRIEF DESCRIPTION OF THE DRAWINGS

The invention will now be described by way of example with reference to the accompanying drawings of which.

DETAILED DESCRIPTION OF THE INVENTION

Figure 1:
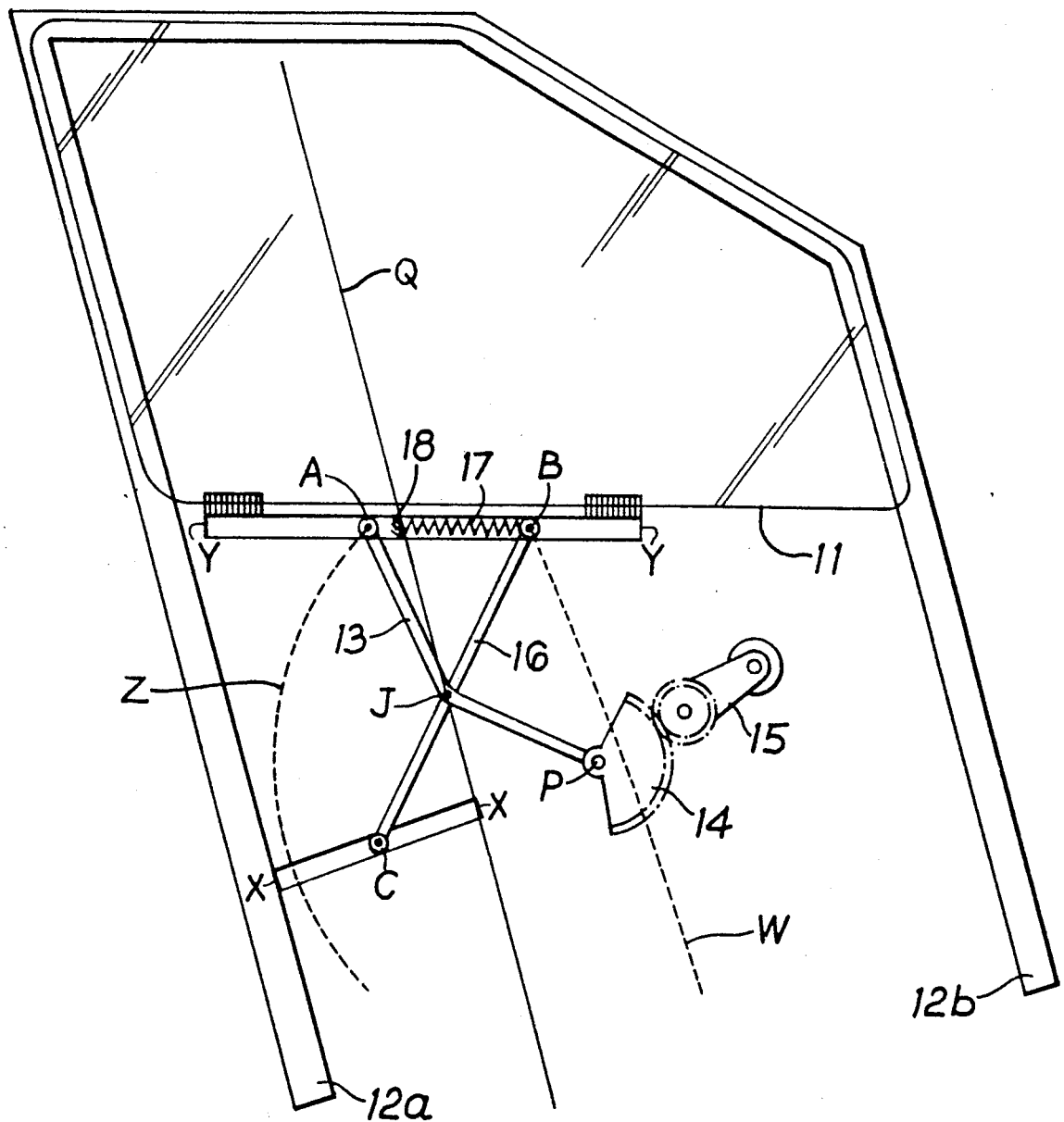
FIG. 1 a schematic representation of a window regulator according to the invention showing a window pane in its raised position.
Figure 2:
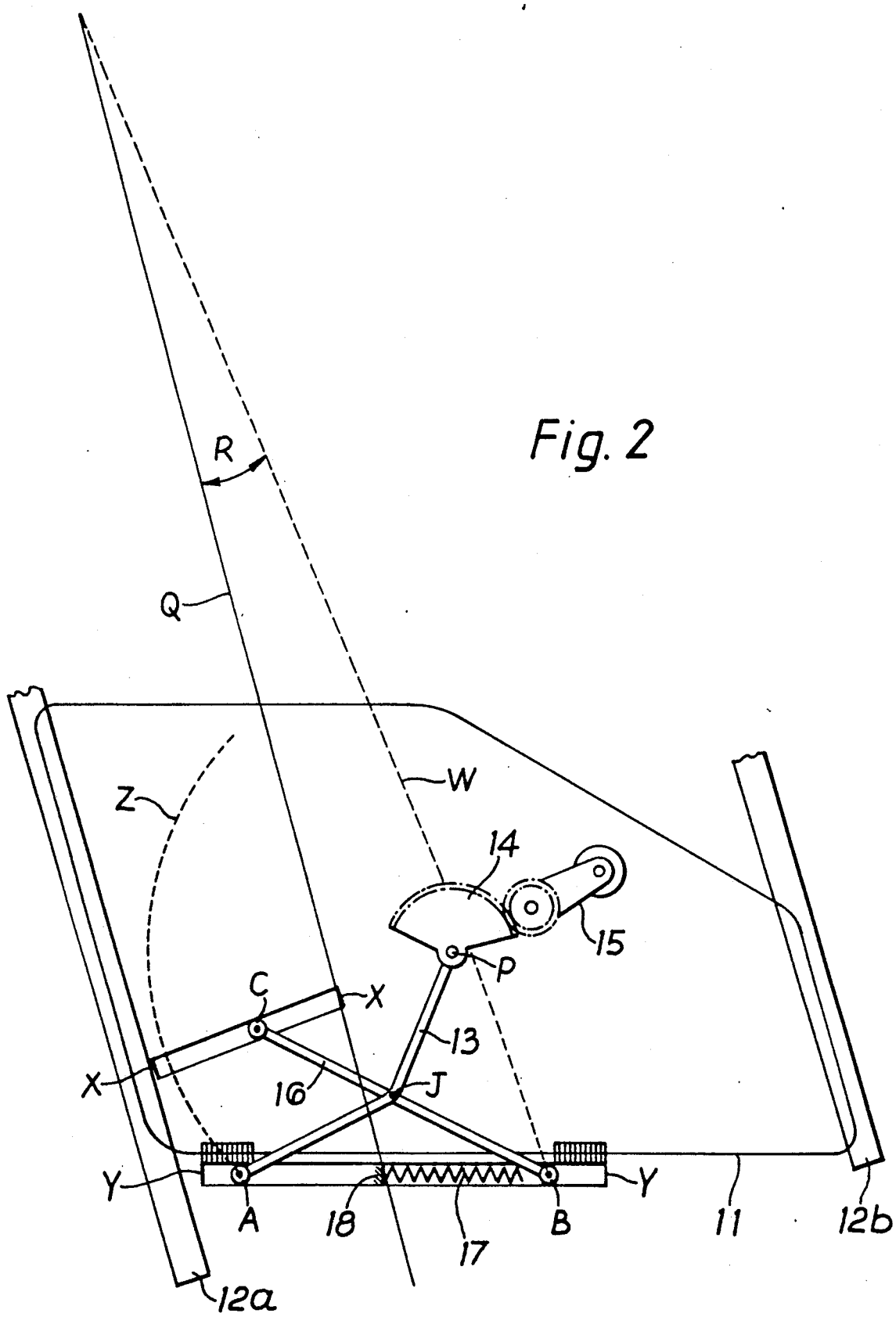
FIG. 2 is a schematic representation of a window regulator according to the invention showing the window pane in a lowered position.

With reference to FIGS. 1 and 2 there is shown a window pane 11 guided on two opposite edges by guide means in the form of U-shaped channels 12a and 12b.

A lifting arm 13 is slidingly connected to the window pane 11 at one end by a roller A located in a track Y—Y attached to the lower edge of the window pane 11.

The lifting arm 13 is pivotable about a point 'P' at its other end

Means in the form of the quadrant 14 connected to the lifting arm 13 and a geared handle 15 are provided to produce rotation of said lifting arm 13 about said point 'P'.

The lifting arm 13 is pivotally interconnected at a position 'J' spaced apart from the position 'P' to a control arm 16. The position of interconnection being intermediate the respective ends of the lifting and control arms 13 and 16.

The control arm 16 is slidingly connected to the window pane 11 at one end by means of a roller 'B' engaged with the track Y—Y and is constrained to move in a pre-determined manner at its other end by means of engagement of a roller 'C' with a track X—X attached to part of a support frame of the motor vehicle door (not shown).

A compression spring 17 is interposed between the roller B and an abutment 18 fixed to the track Y—Y.

Considering FIG. 1 rotation of the geared handle 15 in a clockwise direction will produce controlled movement of the window pane 11 from its raised position as shown towards its lowered position as shown in FIG. 2.

The clockwise rotation of the geared handle 15 causes anticlockwise rotation of the quadrant 14 and the lifting arm 13 about the point P, the roller A moving through an arc depicted by line 'Z' on FIG. 1.

The anticlockwise rotation of the lifting arm 13 is transferred to the control arm 16 through the point of interconnection 'J' causing the control arm to pivot in a clockwise direction about the roller C, the locus of movement of the roller B being depicted by line W.

The respective lengths of the lifting arm 13 and the control arm 16 is such that the locus of movement of the roller B is inclined at an angle R to the axis of movement of the window pane 11, as depicted by the line Q.

The effect of the inclination R is that the distance between the abutment 18 and the roller B increases as the window pane is lowered thereby reducing the biasing effect of the spring 17.

As is shown in FIG. 2 when the window pane 11 is in its fully lowered position the distance between the abutment 18 and the roller B is greater than the free length of the spring 17.

This arrangement provides an initial period in which the window pane 11 can find its own position within the guides 12a and 12b thereby reducing friction between the window pane 11 and its guides 12a and 12b but as it approaches the fully raised position the biasing force of the spring 17 takes effect urging the window pane 11 against the guide 12a thereby ensuring correct location of the window pane 11 with respect to its seal (not shown).

Figure 3:
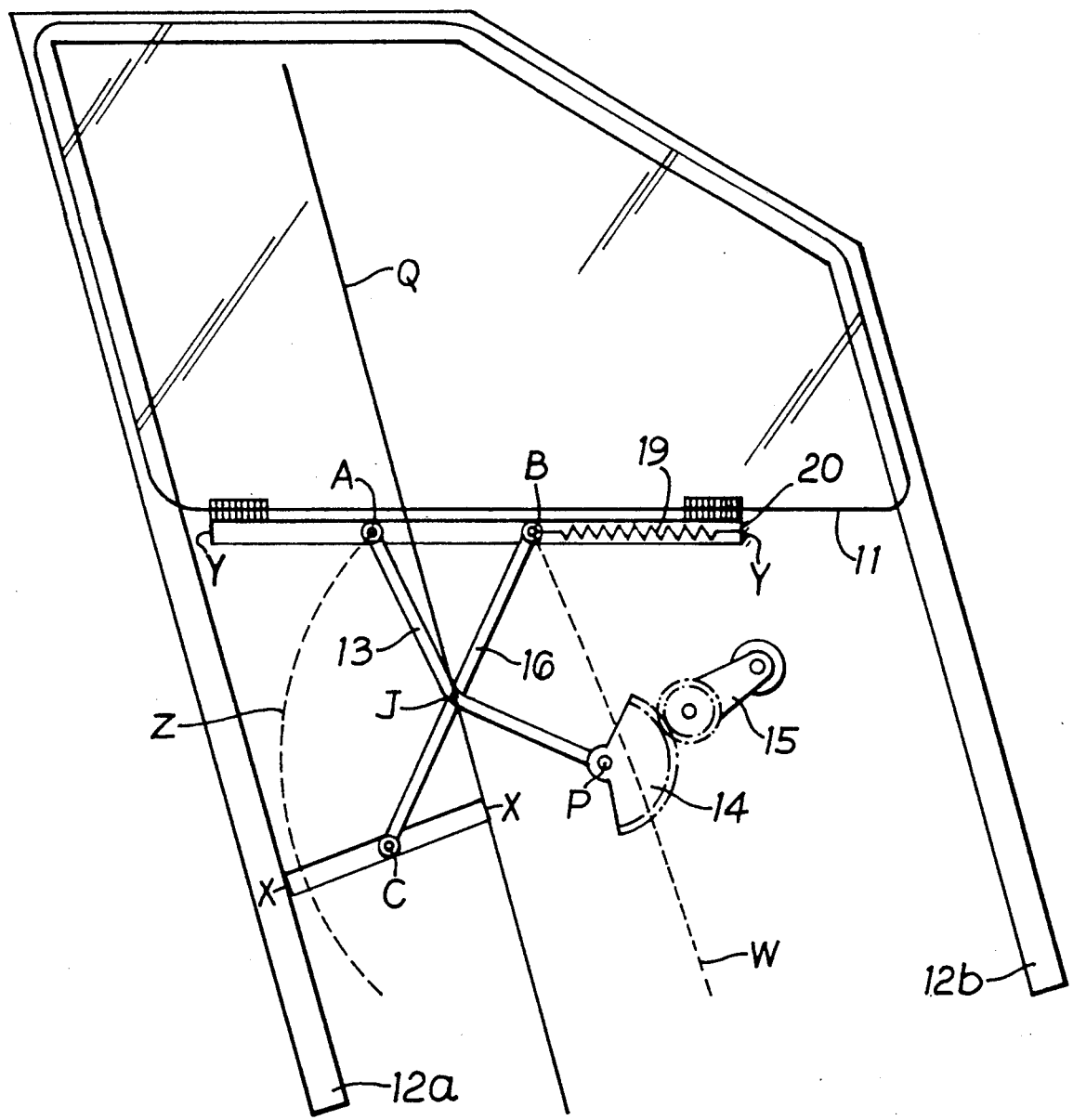
FIG. 3 shows the window regulator of FIG. 1 having a tension spring in stead of a compression spring.

Referring to FIG. 3, in place of the compression spring, as described above, a tension spring 19 is used to effect the same action. The tension spring 19 is interposed between the roller B and abutment 20 fixed to the track Y—Y. The distance between the roller B and the abutment 20 increases as the window pane is raised thereby increasing the biasing force on the window pane as the spring is extended. With such an arrangement it is desirable that the distance between the roller B and the position of attachment of the tension spring to the window pane be substantially equal to the free length of the tension spring when the window pane is in its lowered position.

I claim:

1. A window regulator for a motor vehicle, said window regulator being arranged to provide a controlled movement of a window pane between a raised position and a lowered portion, said window pane being guided on two opposite edges by guide means, said window regulator comprising a lifting arm slidingly connected to said window pane at one end and pivotable about a point near its other end, means to produce rotation of said lifting arm about said point to produce said controlled movement of said window pane and a control arm slidingly connected to said window pane at one end and constrained at its other end to move in a pre-determined manner in response to pivotal movement of said lifting arm about said point, said lifting arm and said control arm being pivotally interconnected intermediate their respective ends at a position spaced from said point wherein means are provided to bias said window pane towards one of said guide means only when said window pane approaches its raised position.

2. A window regulator as in claim 1 in which said means to bias said window pane is a spring.

3. A window regulator for a motor vehicle, said window regulator being arranged to provide a controlled movement of a window pane between a raised position and a lowered position, said window pane being guided on two opposite edges by guide means, said window regulator comprising a lifting arm slidingly connected to said window pane at one end and pivotable about a point near its other end, means to produce rotation of said lifting arm about said point to produce said controlled movement of said window pane and a control arm slidingly connected to said window pane at one end and constrained at its other end to move in a pre-determined manner in response to pivotal movement of said lifting arm about said point, said lifting arm and said control arm being pivotally interconnected intermediate their respective ends at a position spaced from said point wherein means are provided to bias said window pane towards one of said guide means at least when said window pane approaches its raised position,
in which said means to bias said window pane is a spring interposed between said one end of said control arm and a position on said window pane.

4. A window regulator as in claim 3 in which said spring is a compression spring interposed between said one end of said control arm and an abutment fixed to said window pane.

5. A window regulator as in claim 4 in which a locus of movement of said one end of said control arm is such that the said one end moves towards said abutment as said window pane is moved from its lowered position to its raised position.

6. A window regulator as in claim 5 in which, with said window pane is in its lowered position, a distance between said abutment and said one end of said control arm is greater than a free length of said compression spring.

7. A window regulator as in claim 3 in which said spring is a tension spring interposed between said one end of said control arm and an attachment means fixed to said window pane.

8. A window regulator as in claim 7 in which said locus of movement of said one end of said control arm is such that the said one end moves away from said attachment means as said window pane is moved from its lowered position to its raised position.

9. A window regulator as in claim 8 in which, with said window pane is in its lowered position, a distance betwen said attachment means and said one end of said control rod is substantially equal to a free length of said tension spring.

* * * * *